Oct. 16, 1934.  M. B. MORGAN  1,976,887
TWO-SPEED GEARING
Filed Dec. 2, 1932  2 Sheets-Sheet 1
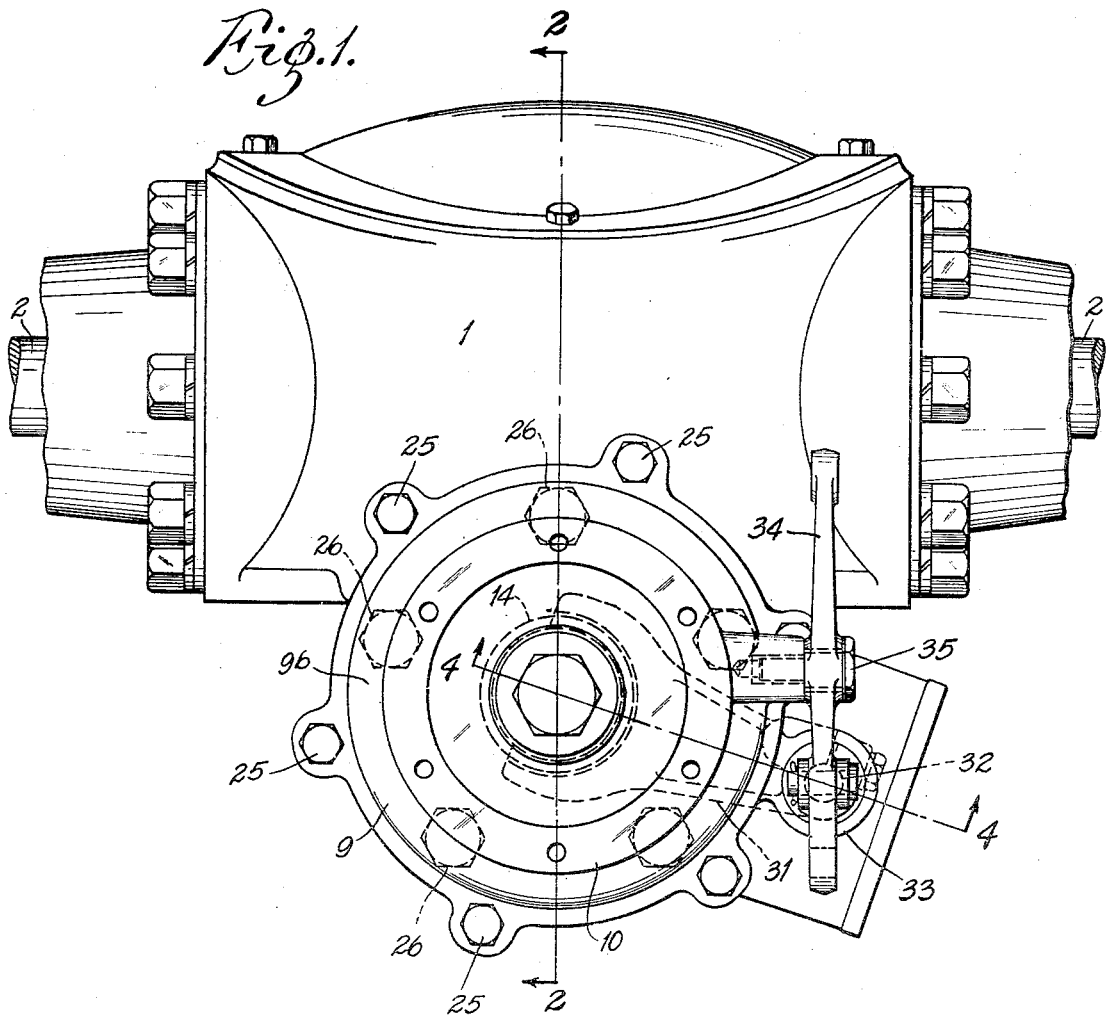
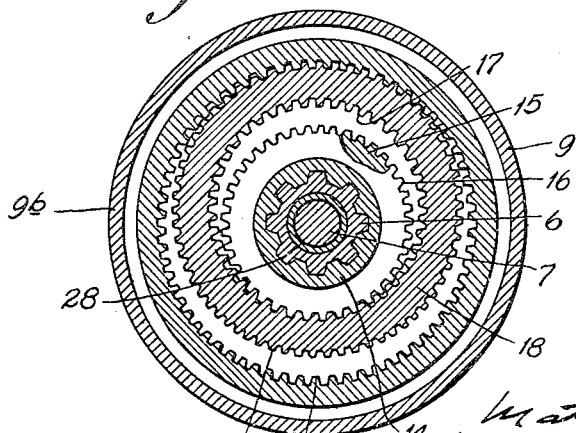
INVENTOR:
Mathew B. Morgan
by [signature]
HIS ATTORNEY.

Oct. 16, 1934.  M. B. MORGAN  1,976,887
TWO-SPEED GEARING
Filed Dec. 2, 1932  2 Sheets-Sheet 2
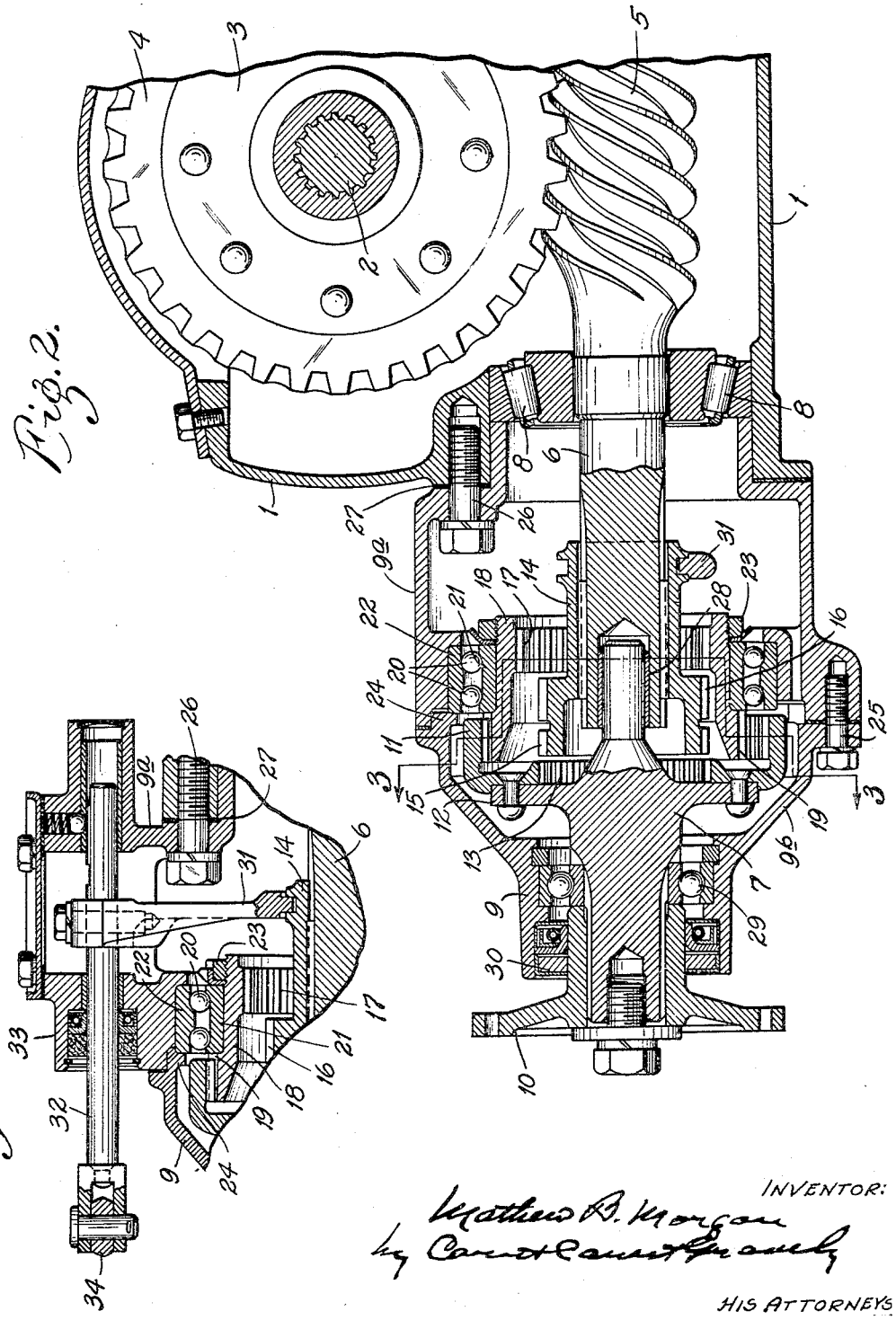
INVENTOR:
Matthew B. Morgan
by Carr & Carr & Branch
HIS ATTORNEYS Patented Oct. 16, 1934

1,976,887

UNITED STATES PATENT OFFICE 1,976,887

TWO-SPEED GEARING

Mathew B. Morgan, Detroit, Mich., assignor to The Timken-Detroit Axle Company, Detroit, Mich., a corporation of Ohio Application December 2, 1932, Serial No. 645,331

2 Claims. (Cl. 74—57)

This invention relates to auxiliary change speed gearing for automobiles, particularly auxiliary two-speed gearing, either under-drive or over-drive, of the type wherein the power is transmitted between two axially alined shafts through a sleeve disposed eccentric thereto and provided with an external gear, which intermeshes continuously with an internal gear fixed to one of said shafts, and an internal gear adapted to intermesh with an external gear slidably splined on the other of said shafts. The invention has for its principal objects to provide for the proper housing of the change speed gearing, to provide a single double row angular contact bearing for supporting the eccentric sleeve, to provide for balancing the load on said bearing, and to provide for simplicity and cheapness of construction and compactness of design.

The invention consists in the change speed gearing and in the construction, combinations and arrangements of parts hereinafter described and claimed.

In the accompanying drawings, which form part of this specification and wherein like symbols refer to like parts wherever they occur, Fig. 1 is a front side elevation of the middle portion of an automotive driving axle equipped with an auxiliary change speed gearing embodying my invention, Fig. 2 is a vertical transverse section through said driving axle on the line 2—2 in Fig. 1, Fig. 3 is a vertical cross-section through the change speed mechanism on the line 3—3 in Fig. 2; and Fig. 4 is a fragmentary section through the clutch shifting mechanism on the line 4—4 in Fig. 1.

In the accompanying drawings, my change speed gearing is shown applied to a common type of automotive driving axle; but it is also capable of application at any of divers locations between the motor and the driving axle. According to the drawings, the automotive driving axle comprises a housing 1 containing axially alined axle shaft sections 2 that are driven by a suitable differential mechanism (not shown) enclosed within the usual differential gear casing 3. Mounted on the differential gear casing 3 is a worm gear 4, which intermeshes with and is driven by a worm 5 on the inner of two axially alined shafts 6 and 7, respectively. In the construction shown, the two axially alined shafts are located below the worm gear 4 with the forward end portion of the inner or driven shaft 6 supported in a suitable anti-friction bearing, preferably a conical roller bearing 8, mounted in an opening in the front wall of the axle housing. The outer or driving shaft 7 and the forward end of the inner or driven shaft 6 are supported in a separate split or two-piece nosing or housing 9 comprising inner and outer sections 9a and 9b that are removably secured together and to the axle housing 1 in register with the opening which receives said inner or driven shaft. The outer or driving shaft 7 extends outwardly beyond the nosing 9 and is provided at its forward end with a driving disk 10 adapted to be operatively connected to the driving motor or engine (not shown).

The adjacent ends of the two axially alined shafts 6 and 7, respectively, are operatively connected by means of a change speed gearing enclosed within the removable nosing 9 of the axle housing 4. Said gearing comprises an internal gear ring 11 that is riveted or otherwise rigidly secured to an outstanding flange or collar 12 on the outer or driving shaft 7 and is provided with an internal clutch member 13. The internal gear 11 and the internal clutch 13 carried by the outer or driving shaft 7 are located adjacent to the outer end of the inner or driven shaft 6 and are spaced apart axially.

Slidably splined on the outer end portion of the inner or driven shaft 6 is a sleeve 14 whose outer end is provided with an external clutch member 15 adapted to be clutched with the internal clutch member 13 on the large internal gear that is fixed to the outer or driving shaft 7. Said end of said sleeve is also provided with an external gear 16 adapted to be intermeshed with a larger internal gear 17 formed in the inner end of a sleeve 18, which surrounds the slidable sleeve 14 and is mounted eccentrically thereto. The outer end of the eccentric sleeve 18 extends into the large internal gear 11 on the inner end of the outer or driving shaft section 7 and is provided with an external gear 19, which intermeshes continuously with said internal gear.

By the arrangement described, when the slidable gear and clutch sleeve 14 is in neutral position with its external gear 16 and external clutch 15 out of engagement with the internal gear 16 and the internal clutch 13, respectively, no motion is imparted to the inner or driven shaft 6. When the slidable gear and clutch sleeve 14 is slid outwardly to cause the external clutch 15 thereon to interlock with the internal clutch 13, the two axially alined shafts 6 and 7 are clutched together and a direct drive is obtained therebetween. When the slidable external gear and clutch sleeve 14 is shifted to bring the external gear 16 thereof into mesh with the internal gear 17 of the eccentric sleeve 18, an over-drive is obtained, the drive being from the internal gear 11 on the outer or driving shaft 7 to the eccentric sleeve 18 and thence through the slidable sleeve 14 to the inner or driven shaft 6.

The eccentric sleeve 18 is rotatably supported intermediate between the gears 17 and 19 thereon in an antifriction bearing, preferably a double row angular contact ball bearing comprising two circular series of balls 20 interposed between the inner and outer raceway members 21 and 22, respectively. It is noted that this single double row angular contact ball bearing provides the same rigidity for the eccentric sleeve as would be obtained by the use of two widely separated single row ball bearings. It is also noted that the eccentric sleeve gears 17 and 19 are on opposite sides of the plane that passes midway between the two series of balls and is hereinafter designated as the transverse center plane of the bearing. In order to prevent cocking of the sleeve, the gears are so positioned that the loads thereon will be substantially balanced about the transverse center plane of the bearing. This condition of balance prevails when the torque on the gear 17 multiplied by its distance from said transverse center plane of the bearing is equal to the product of the torque on the gear 19 multiplied by its distance in the opposite direction from said transverse center plane. The input torque being known, and the torque on the gear 19 being readily computable, it is a simple matter to locate the bearing with its transverse center plane properly positioned between the gears 17 and 19 to effect a proper balancing thereof. The inner raceway member 21 is mounted on the eccentric sleeve 18 between the external gear 19 of said sleeve and a nut 23 threaded on the inner end thereof; and the outer raceway member 22 is mounted in an eccentric seat provided therefor in the outer end of the inner section 9a of the removable two-piece nosing 9 of the axle housing 1 and is held in said seat by a shoulder at the inner end thereof and by an eccentric projection 24 on the inner end of the outer section 9b of said nosing. This eccentric projection 24 serves also as a pilot for properly locating the outer section 9b of the nosing 9 with the reference to the inner section 9a thereof. The outer section 9b of the nosing 9 is preferably secured to the inner section by means of cap screws 25; and the inner section of said nosing is removably secured to the axle housing 1, preferably by means of cap screws 26. Shims 27 are preferably disposed between the inner section 9a of the nosing 9 and the axle housing 1 for the purpose of obtaining the desired adjustment of the conical roller bearing 8 which supports the outer end portion of the inner or driven shaft 6. If desired, the portion corresponding to the inner section 9a of the nosing may be formed integral with the axle housing 1 and a ball bearing substituted for the conical roller bearing 8.

The outer end of the inner or driven shaft 6 is provided with an axial recess 28 adapted to receive and form a pocket bearing for the adjacent inner end of the outer or driving shaft 7. The outer end portion of the outer or driving shaft 7 is preferably journaled in a single row ball bearing 29 mounted in the forward section 9b of the nosing 9; and a suitable oil ring 30 is mounted in the outer end of said section for preventing leakage of oil through the shaft receiving opening therein. The slidable sleeve 14 is slid longitudinally of the shaft 6 by a shifting fork 31, which engages an annular groove in the inner end of said sleeve. As shown in the drawings, the shifting fork 31 is fixed to and moves with an axially slidable shifter rod 32, which is slidably supported in a portion 33 that projects laterally from one side of the inner section 9a of the nosing 9. The shifter rod 32 is actuated by means of a lever 34 that is pivotally secured to the nosing 9 by means of a cap screw 35.

The construction hereinbefore described is simple, economical and easy to manufacture and assemble. It is strong and durable, it contains a minimum number of parts that are compactly housed within the nosing whose outer section may be removed without disturbing the inner shaft, the eccentric sleeve and its bearing, or the slidable sleeve and its shifting mechanism. The single double row angular contact ball bearing provides a rigid support for the eccentric sleeve that is the equivalent of two widely spaced single row ball bearings, while the proper spacing of the gears on said sleeve from the transverse center plane of said bearing serves to balance the load on said bearing and thus prevent said sleeve from cocking therein.

Obviously, the hereinbefore described arrangement admits of considerable modification without departing from the invention. Therefore, I do not wish to be limited to the precise construction shown and described.

What I claim is:

1. In a change speed mechanism having power transmitting gearing including axially alined internal and external gears, a sleeve on which said gears are mounted and a double row angular contact ball bearing for rotatably supporting said sleeve intermediate between the gears thereon, the improvement comprising spacing said gears on opposite sides of the transverse center plane of said bearing and at such distances from said plane that the torque on the gear on one side of said plane multiplied by the distance of said gear therefrom is equal to the product of the torque of the gear on the other side of said plane multiplied by its distance from said plane, whereby the loads on said gears are balanced about said plane.

2. In a change speed mechanism having two axially alined shafts, an internal gear and internal clutch member rotatable with one of said shafts, a sleeve slidably splined on the other of said shafts and provided with an external gear and with an external clutch member adapted to be engaged with said internal clutch member, a double row angular contact ball bearing, and a sleeve supported in said ball bearing eccentric to said slidable sleeve and provided on one side of the transverse center plane of said bearing with an external gear intermeshing continuously with said internal gear and on the opposite side of said plane with an internal gear adapted to intermesh with the external gear of said slidable sleeve, the improvement comprising locating the eccentric sleeve gears at such distances from said center plane that their loads balance each other.

MATHEW B. MORGAN.